United States Patent
Ji et al.

(10) Patent No.: US 9,934,557 B2
(45) Date of Patent: Apr. 3, 2018

(54) METHOD AND APPARATUS OF IMAGE REPRESENTATION AND PROCESSING FOR DYNAMIC VISION SENSOR

(71) Applicant: Samsung Electronics Co., Ltd., Gyeonggi-do (KR)

(72) Inventors: Zhengping Ji, Temple City, CA (US); Kyoobin Lee, Gyeonggi-do (KR); Qiang Zhang, Pasadena, CA (US); Yibing Michelle Wang, Temple City, CA (US); Hyun Surk Ryu, Gyeonggi-do (KR); Ilia Ovsiannikov, Studio City, CA (US)

(73) Assignee: Samsung Electronics Co., Ltd (KR)

( * ) Notice: Subject to any disclaimer, the term of this patent is extended or adjusted under 35 U.S.C. 154(b) by 5 days.

(21) Appl. No.: 15/148,657

(22) Filed: May 6, 2016

(65) Prior Publication Data
US 2017/0278221 A1    Sep. 28, 2017

Related U.S. Application Data

(60) Provisional application No. 62/311,599, filed on Mar. 22, 2016.

(51) Int. Cl.
*G06K 9/00* (2006.01)
*G06T 5/00* (2006.01)
(Continued)

(52) U.S. Cl.
CPC ............... *G06T 5/002* (2013.01); *G06K 9/00* (2013.01); *G06T 5/50* (2013.01); *G06T 7/003* (2013.01);
(Continued)

(58) Field of Classification Search
CPC .. G02B 27/0075; G02B 5/20; G02B 27/1066; G02B 27/123; G02B 3/0056; G02B 5/201; G06T 2207/10012; G06T 2207/10024; G06T 2207/10052; G06T 7/593; G06T 7/85; G06T 2207/10076;
(Continued)

(56) References Cited

U.S. PATENT DOCUMENTS 7,542,622 B1    6/2009   Angelini et al.
8,780,240 B2    7/2014   Posch et al.
(Continued)

FOREIGN PATENT DOCUMENTS

WO    WO 2015-166176    11/2015

*Primary Examiner* — Aklilu Woldemariam
(74) *Attorney, Agent, or Firm* — The Farrell Law Firm, P.C.

(57) ABSTRACT

An apparatus and a method. The apparatus includes an image representation unit configured to receive a sequence of frames generated from events sensed by a dynamic vision sensor (DVS) and generate a confidence map from non-noise events; and an image denoising unit connected to the image representation unit and configured to denoise an image in a spatio-temporal domain. The method includes receiving, by an image representation unit, a sequence of frames generated from events sensed by a DVS, and generating a confidence map from non-noise events; and denoising, by an image denoising unit connected to the image representation unit, images formed from the frames in a spatio-temporal domain.

10 Claims, 3 Drawing Sheets

(51) Int. Cl.
*G06T 5/50* (2006.01)
*G06T 7/00* (2017.01)
*H04N 5/217* (2011.01)

(52) U.S. Cl.
CPC ... *H04N 5/217* (2013.01); *G06T 2207/20182* (2013.01)

(58) Field of Classification Search
CPC . G06T 2207/10132; G06T 2207/20021; G06T 2207/20056; G06T 2207/30048; G06T 5/002; G06T 5/10; G06T 2207/10021; G06T 2207/10028; G06T 2207/20032; G06T 2207/20182; G06T 7/246; G06T 2207/10016; G06T 7/0065; G06T 7/557; G06T 1/0007; G06T 15/05; G06T 3/4007; G06T 3/4053; G06T 9/00; G06T 15/20; G06T 2207/20064; G06T 7/0014; G06T 2200/21; G06T 2207/20192; G06T 7/80; G06T 2207/30208; G06T 2207/30244; G06T 7/70; G06T 7/50; G06T 9/20; H04N 13/0242; H04N 2013/0081; H04N 2013/0088; H04N 9/097; H04N 5/357; H04N 9/04; H04N 5/33; H04N 13/0239; H04N 5/332; H04N 5/349; H04N 9/735; H04N 19/136; H04N 5/2258; H04N 5/35563; G06K 2209/05; G06K 9/40; G06K 9/00711; G06K 9/36; G06K 9/00127; G06K 9/6269; G06K 9/52; G06K 9/00791; G08B 13/19613; H01L 2924/00; H01L 27/14621; B60R 2300/302; G06F 17/30781; G01B 11/2509; G09G 5/14

USPC ........ 382/103, 107, 254, 275; 348/340, 355, 348/368; 345/156, 419

See application file for complete search history.

(56) References Cited

U.S. PATENT DOCUMENTS

| | | | |
|---|---|---|---|
| 8,831,111 | B2 | 9/2014 | Au et al. |
| 9,031,343 | B2 * | 5/2015 | Venkataraman .......... G06T 9/00 382/250 |
| 9,058,654 | B2 | 6/2015 | Pescatore et al. |
| 9,240,049 | B2 * | 1/2016 | Ciurea .................... G06T 7/593 |
| 2006/0017720 | A1 * | 1/2006 | Li ...................... G01B 11/2504 345/419 |
| 2008/0285655 | A1 * | 11/2008 | Au ....................... H04N 19/577 375/240.16 |
| 2008/0316364 | A1 * | 12/2008 | Au ........................... H04N 5/21 348/608 |
| 2009/0257621 | A1 * | 10/2009 | Silver .................. G06K 9/6202 382/103 |
| 2010/0002929 | A1 * | 1/2010 | Sammak ............ G06K 9/00127 382/133 |
| 2010/0183071 | A1 * | 7/2010 | Segall ...................... G06T 5/50 375/240.16 |
| 2014/0267243 | A1 * | 9/2014 | Venkataraman ...... G06T 7/0065 345/419 |
| 2014/0368712 | A1 | 12/2014 | Park et al. |
| 2015/0030204 | A1 | 1/2015 | Lee et al. |
| 2015/0125092 | A1 * | 5/2015 | Zhuo ...................... G06T 5/002 382/275 |
| 2015/0324000 | A1 | 11/2015 | Park et al. |
| 2016/0027161 | A1 * | 1/2016 | Aydin .................... G06T 5/009 382/162 |

\* cited by examiner

METHOD AND APPARATUS OF IMAGE REPRESENTATION AND PROCESSING FOR DYNAMIC VISION SENSOR

PRIORITY

This application claims priority under 35 U.S.C. § 119(e) to a U.S. Provisional Patent Application filed on Mar. 22, 2016 in the United States Patent and Trademark Office and assigned Ser. No. 62/311,599, the entire contents of which are incorporated herein by reference.

FIELD

The present disclosure relates generally to a method and apparatus of image representation and processing, and more particularly, to a method and apparatus of image representation and processing for a dynamic vision sensor (DVS).

BACKGROUND

A DVS is an event based camera that senses a change in luminance. A DVS does not capture a scene in frames, but functions similarly to a human retina. That is, a DVS transmits only a change in a pixel's luminance (e.g., an event) at a particular location within a scene at the time of the event. The output of a DVS is a stream of events, where each event is associated with an event state.

Since a DVS is an asynchronous sensor without time integration, an image formed using a DVS often contains a large amount of noise. Filtering noise is one of the most important steps for a DVS to provide a valid representation of a scene. Conventional denoising of images is based on a template for filtering, which analyzes a group of pixels and finds the biased pixel(s) to filter out as noise, where only spatial correlation of a pixel matters. However, each event of a DVS is associated with not only spatial information (i.e., a location of a pixel relative to locations of other pixels) but also temporal information (i.e., an arrival time of pixel information relative to arrival times of information of other pixels).

SUMMARY

According to one embodiment, an apparatus includes an image representation unit configured to receive a sequence of frames generated from events sensed by a dynamic vision sensor (DVS) and generate a confidence map from non-noise events; and an image denoising unit connected to the image representation unit and configured to denoise an image in a spatio-temporal domain.

According to one embodiment, an apparatus includes a DVS configured to generate a stream of events; a sampling unit connected to the DVS and configured to sample the stream of events; an image formation unit connected to the sampling unit and configured to form an image for each sample of the stream of events; an image representation unit connected to the image formation unit and configured to generate a confidence map for non-noise events; an image undistortion unit connected to the image representation unit and configured to compensate for distortion in frames; and an image matching unit connected to the image undistortion unit and the sampling unit and configured to match frames and adjust a sampling method of the sampling unit, if necessary.

According to one embodiment, a method includes receiving, by an image representation unit, a sequence of frames generated from events sensed by a DVS, and generating a confidence map for non-noise events; and denoising, by an image denoising unit connected to the image representation unit, images formed from the frames in a spatio-temporal domain.

According to one embodiment, a method includes generating, by a DVS, a stream of events; sampling, by a sampling unit connected to the DVS, the stream of events; forming, by an image formation unit connected to the sampling unit, an image for each sample of the stream of events; receiving, by an image representation unit connected to the image formation unit, images formed by the image formation unit and generating a confidence map from non-noise events; compensating for distortion, by an image undistortion unit connected to the image representation unit, in frames; and matching, by an image matching unit connected to the image undistortion unit and the sampling unit, frames and adjusting a sampling method of the sampling unit, if necessary.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
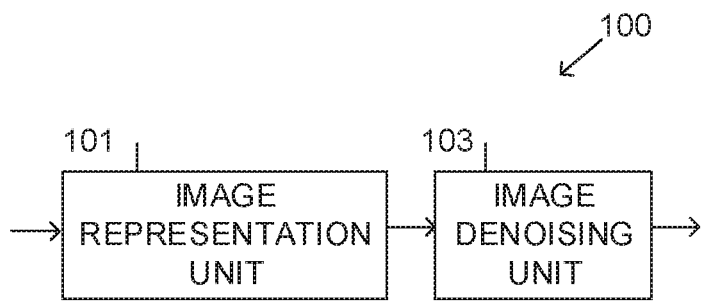
FIG. 1 is a block diagram of an apparatus of image representation and processing of frames of DVS events, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The present disclosure provides a denoising method for a DVS which filters noise in a spatio-temporal domain and a representation to evaluate the importance of each valid (denoised) pixel. The representation is referred to as a confidence map and is useful in maintaining key features among frames and leads to better matching in adjacent frames.

In embodiments of the present disclosure an apparatus for and a method of event sampling of a DVS are provided. To utilize a DVS for certain tasks (e.g., visual recognition, simultaneous localization and mapping (SLAM), pattern recognition, scene understanding, gesture recognition for gesture based user-device interaction (e.g., television (TV), game), user recognition (e.g., for TV, mobile device), and robotics), a DVS stream must be converted to an image to reflect structural patterns in an environment. A stream of DVS events (e.g., an event stream) is sampled in a manner to generate images with reduced variations therebetween. Reducing variations in images generated from an event stream benefits image-based tasks.

The present disclosure concerns an apparatus and a method of image representation and processing for a DVS to minimize frame-to-frame variation in order to benefit frame-to-frame matching. In addition, the present disclose removes noise while maintaining key event (e.g., key features) of DVS frames in a sequence. Furthermore, the present disclosure concerns an apparatus and a method of weighted image matching based on image representation of a confidence map, which leads to improved matching accuracy, which benefits DVS applications such as image recognition, SLAM, etc.

FIG. 1 is a block diagram of an apparatus 100 of image representation and processing of DVS events, according to an embodiment of the present disclosure.

Referring to FIG. 1, the apparatus 100 includes an image representation unit 101 and an image denoising unit 103.

The image representation unit 101 includes an input for receiving a sequence of frames generated from events sensed by a DVS and an output, and configured to generate a confidence map from non-noise events.

A DVS captures a change in pixel luminance (e.g., an event) within a scene and outputs a stream of events, where each event has a state. The state of an event includes a location of the event within a camera array and a binary value indicating either a positive or a negative change in the luminance of the associated event as compared to an immediately preceding state of the associated location. Four values may represent an event state (i.e., an x and a y coordinate of a pixel indicating a location of the event, either a value of +1 to indicate a positive change in luminance of the event, a value of −1 to indicate a negative change in luminance of the event, or a value of 0 to indicate no change in luminance of the event as compared to an immediately preceding event state of the associated location, and a timestamp of the event).

A sampling unit may include an input connected to the output of a DVS for receiving a stream of events from the DVS, and an output for outputting samples of the event stream. The sampling unit may sample an event stream based on a time period, a number of events, or a combination thereof. The sampling unit may include an output for outputting samples of an event stream to an image formation unit.

An image formation unit may include an input connected to the output of a sampling unit for receiving samples of an event stream. A certain number of DVS events are sampled to form an image, where pixel locations containing one or more events are set to non-zero values and other pixel locations are set to zero. The value of each non-zero pixel may be determined by different methods. For example, each non-zero pixel may be represented by its latest event state, e.g., +1 for a positive change in luminance and −1 for a negative change in luminance, the number of events appearing at a location, or the arrival time of the latest event. The image formation unit forms an image from each sample of an event stream and outputs each image formed. An image output by the image formation unit may be used in an application or application unit that requires an image (e.g., visual recognition, SLAM, pattern recognition, scene understanding, gesture recognition for gesture based user-device interaction (e.g., television (TV), game), user recognition (e.g., for TV, mobile device), and robotics). A sequence of images formed by the image formation unit may be provided as input to the image representation unit 101.

The image representation unit 101 determines, for each DVS event in the sequence of frames received by the image representation unit 101, a number of events $N_1$ within a predetermined neighborhood of the event in question and within a predetermined time window W. If $N_1$ for an event in question is less than a first threshold $T_1$ then the event in question is discarded as noise. The non-noise events are considered valid events.

For each non-noise event, a neighborhood density is determined. The neighborhood density I(valid_evt) for an event in question may be determined using Equation (1) as follows:

$$I(\text{valid}_{evt}) = \begin{cases} \dfrac{M}{\max(R_1, S)}, & \text{when } M \leq R_2 \\ \dfrac{M}{k}, & \text{when } M > R_2 \end{cases} \quad (1)$$

where M is a number of events within a predetermined neighborhood of the event in question, including the event in question, S is a predetermined time window, $R_1$ is a threshold for avoiding values of S that are less than $R_1$, $R_2$ is a threshold when M is considered large (e.g., larger than a predetermined value) for generating a higher value of I(valid_evt), and k is a predetermined constant. However, the present disclosure is not limited to using Equation (1) above to determine neighborhood density. Other equations for determining neighborhood density may be used.

Each event that has a neighborhood density greater than a second threshold $T_2$ is identified as an event in which there is high confidence that it is a valid event (e.g., a confidence event) and not noise. The confidence events are included in the confidence map. Confidence events in a current frame are used as support events in the next frame for denoising, as described in more detail below.

The image denoising unit 103 includes an input connected to the output of the image representation unit 101, and an output, and is configured to denoise an image in a spatio-temporal domain.

The image denoising unit 103 determines, for each DVS event in the sequence of frames received by the image representation unit 101, a number of events $N_2$ within the predetermined neighborhood of the event in question and within the predetermined time window W.

For a frame that immediately precedes the frame of the event in question (e.g., a current frame), a number C of confidence events in the immediately preceding frame is determined that are within a corresponding neighborhood of the current frame. A value ($N_2+(\alpha \times C)$) is determined, where a is a predetermined constant. If ($N_2+(\alpha \times C)$) for an event in question is less than a third threshold $T_3$ then the event in question is discarded as noise. Denoised frames are then output by the image denoising unit 103.

Figure 2:
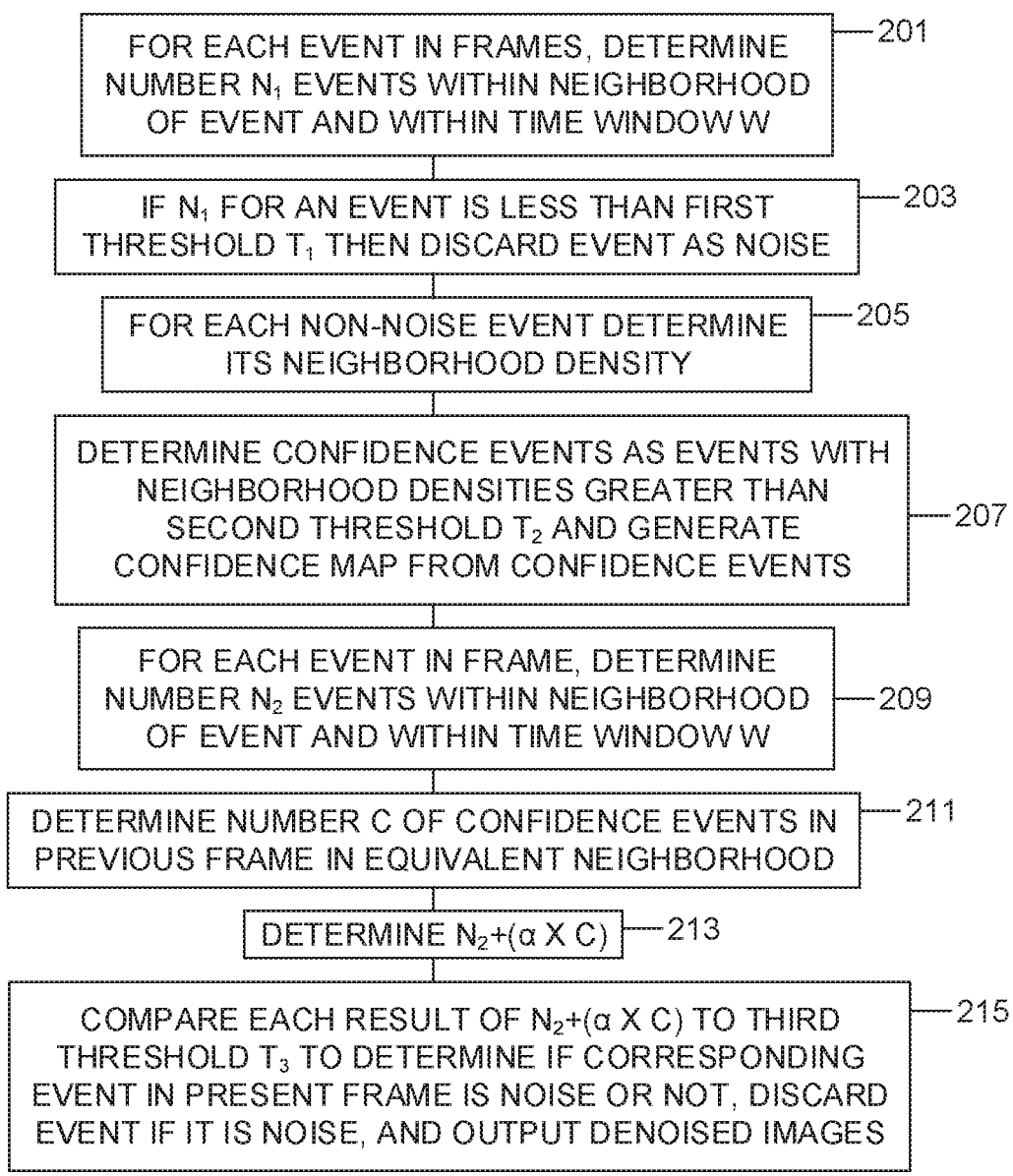
FIG. 2 is a flowchart of a method of image representation and processing of DVS events, according to an embodiment of the present disclosure.

FIG. 2 is a flowchart of a method of image representation and processing of DVS events, according to an embodiment of the present disclosure.

Referring to FIG. 2, a number of events $N_1$ are determined, in an image representation unit, that are within a predetermined neighborhood of the event in question and within a predetermined time window W at 201 for each DVS event in a sequence of DVS frames.

If $N_1$ for an event in question is less than a first threshold $T_1$ then the event in question is discarded, in the image representation unit, as noise at 203. The non-noise events are considered valid events.

For each non-noise event, a neighborhood density is determined, in the image representation unit, at 205. The neighborhood density I(valid_evt) for an event in question may be determined using Equation (1) above. However, the present disclosure is not limited to using Equation (1) above to determine neighborhood density. Other equations for determining neighborhood density may be used.

Each event that has a neighborhood density greater than a second threshold is identified, in the image representation unit, as an event in which there is high confidence that it is a valid event (e.g., a confidence event) and not noise, and the confidence events are included in a confidence map at 207. Confidence events in a current frame are used as support events in the next frame for denoising, as described in more detail below.

For each DVS event in the sequence of frames, a number of events $N_2$ within the predetermined neighborhood of the event in question and within the predetermined time window W is determined, by the image denoising unit, at 209.

For a frame that immediately precedes the frame of the event in question (e.g., a current frame), a number C of confidence events in the preceding frame is determined, by the image denoising unit, that are within a corresponding neighborhood of the current frame at 211.

A value ($N_2+(\alpha \times C)$) is determined, by the image denoising unit, where a is a predetermined constant at 213.

If ($N_2+(\alpha \times C)$) for an event in question is less than a third threshold $T_3$ then the event in question is discarded as noise, and denoised frames are then output by the image denoising unit at 215.

Figure 3:
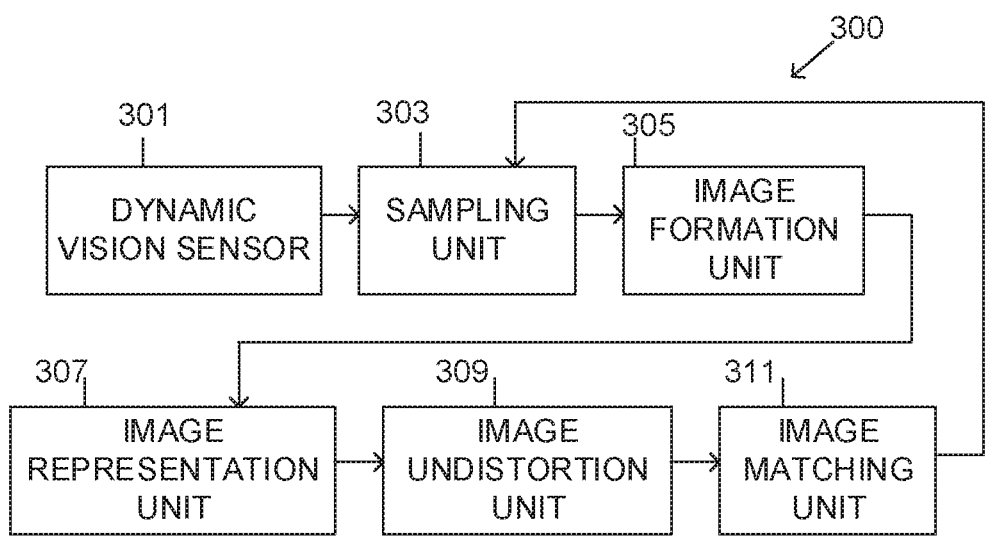
FIG. 3 is a block diagram of an apparatus of image representation and processing of DVS events, according to an embodiment of the present disclosure.

FIG. 3 is a block diagram of an apparatus 300 of image representation and processing of DVS events, according to an embodiment of the present disclosure.

Referring to FIG. 3, the apparatus 300 includes a DVS 301, a sampling unit 303, an image formation unit 305, an image representation unit 307, an image undistortion unit 309, and an image matching unit 311.

In an embodiment of the present disclosure, the apparatus 300 may include an image denoising unit between the image representation unit 307 and the image undistortion unit 309 to denoise images. However, an image denoising unit is not required for image matching.

The DVS 301 captures a change in pixel luminance (e.g., an event) within a scene and outputs a stream of events, where each event has a state. The state of an event includes a location of the event within a camera array and a binary value indicating either a positive or a negative change in the luminance of the associated event as compared to an immediately preceding state of the associated location.

The sampling unit 303 includes a first input connected to the output of the DVS 301 for receiving a stream of events from the DVS 301, a second input for adjusting a sampling manner of the sampling unit 303, and an output for outputting samples of the event stream. For the first two samples, the sampling manner may be the same, because at least two images may be needed before an adjustment to the manner of sampling may be made. Thereafter, the sampling manner may be different for the next sample.

The image formation unit 305 includes an input connected to the output of the sampling unit 303 for receiving samples of an event stream. The image formation unit 305 forms an image from each sample of an event stream and outputs an image for each sample of an event stream. The images formed for the first two samples are formed on the basis of the same manner of sampling, because at least two images may be needed before an adjustment to the manner of sampling may be made. Thereafter, each subsequent image may be formed on the basis of a different manner of sampling than the immediately preceding manner of sampling.

The image representation unit 307 includes an input connected to the output of the image formation unit 305, and an output. The image representation unit 307 may function similarly to the image representation unit 101 described above.

The image undistortion unit 309 includes an input connected to the output of the image representation unit 307, and an output. The image undistortion unit 309 removes or modifies a denoised image to compensate for distortion. Distortion compensation includes reducing distortion. However, the present disclosure is not limited thereto.

The image matching unit 311 includes an input connected to the output of the image undistortion unit 309, and an output connected to the second input of the sampling unit 303. The image matching unit 311 compares two images output by the image undistortion unit 309 and determines whether events in the two images match (e.g., share the same location). Matched events are referred to as reference events. The image matching unit 311 outputs a signal to the sampling unit 303 to adjust the sampling manner, where the sampling manner may be reduced (e.g., reduce the sampling period, reduce the predetermined number of events in a sample, or reduce a combination of sampling period and number of events), the sampling manner may be increased (e.g., increase the sampling period, increase the predetermined number of events in a sample, or increase a combination of sampling period and number of events), or the sampling manner may be maintained.

In an embodiment of the present disclosure, the image matching unit 311 may match frames using weighted frame-to-frame matching. Weighted frame-to-frame matching may be performed as represented in Equation (2) as follows:

$$\arg\min \tfrac{1}{2}\Sigma_i (C(p_i)\|I^{(1)}(p_i)-I^{(2)}(T\times p_i)\|^2, \qquad (2)$$

where arg min $f(x)$ is an argument-of-a-minimum function that determines the value x for which a function $f(x)$ attains its minimum. The object function here is to minimize point-to-point photonic error between two images, where i is a location in a confidence map $C^{(1)}$ of a first image $I^{(1)}$, $p_i$ is a coordinate for location i, $I^{(2)}$ is a second image, and T is a transformation matrix to seek that minimizes the arg min function. However, the present disclosure is not limited to using weighted frame-to-frame matching as represented by Equation (2) above. Other equations for weighted frame-to-frame matching may be used in the present disclosure.

An image output by the image matching unit 311 may be used in an application or application unit that requires an image (e.g., visual recognition, simultaneous localization and mapping (SLAM), pattern recognition, scene understanding, gesture recognition for gesture based user-device interaction (e.g., television (TV), game), user recognition (e.g., for TV, mobile device), and robotics).

Figure 4:
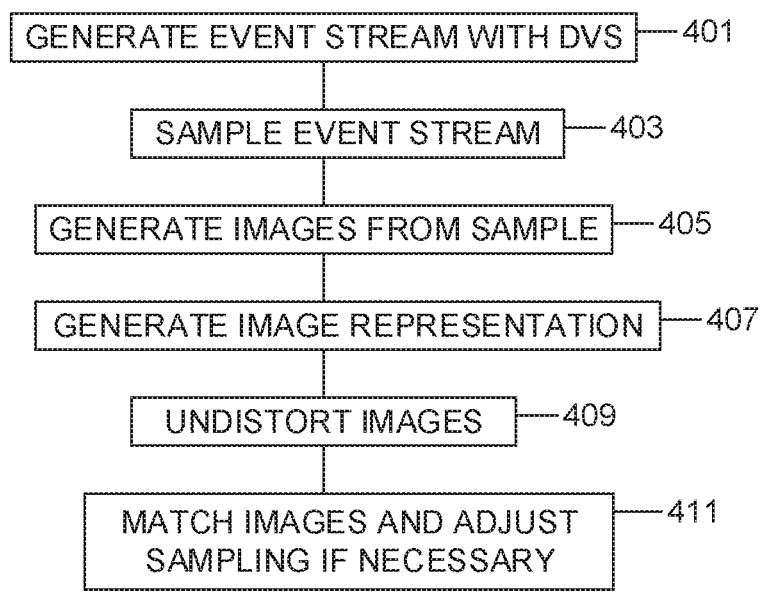
FIG. 4 is a flowchart of a method of image representation and processing of DVS events, according to an embodiment of the present disclosure.

FIG. 4 is a flowchart of a method of image representation and processing of DVS events, according to an embodiment of the present disclosure.

Referring to FIG. 4, an event stream is generated by a DVS (e.g., the DVS 301 of FIG. 3) at 401.

At 403, the event stream is sampled in a manner by a sampling unit (e.g., the sampling unit 303 of FIG. 3).

At 405, images are generated for the samples by an image formation unit (e.g., the image formation unit 305 of FIG. 3).

At 407, confidence events are identified by an image representation unit (e.g., the image representation unit 101 of FIG. 1).

In an embodiment of the present disclosure, images may be denoised by an image denoising unit (e.g., the image denoising unit 103 of FIG. 1). However, denoising of images is not required for image matching.

At 409, denoised images are undistorted by an undistortion unit (e.g., the image undistortion unit 311 of FIG. 3).

At 411, the images are matched by an image matching unit (e.g., the image matching unit 313 of FIG. 3, and sampling is adjusted, if necessary.

In an embodiment of the present disclosure, image matching of frames may be performed using weighted frame-to-frame matching. Weighted frame-to-frame matching may be performed as represented in Equation (2) above. However, the present disclosure is not limited to using weighted frame-to-frame matching as represented by Equation (2) above. Other equations for weighted frame-to-frame matching may be used in the present disclosure.

Figure 5:
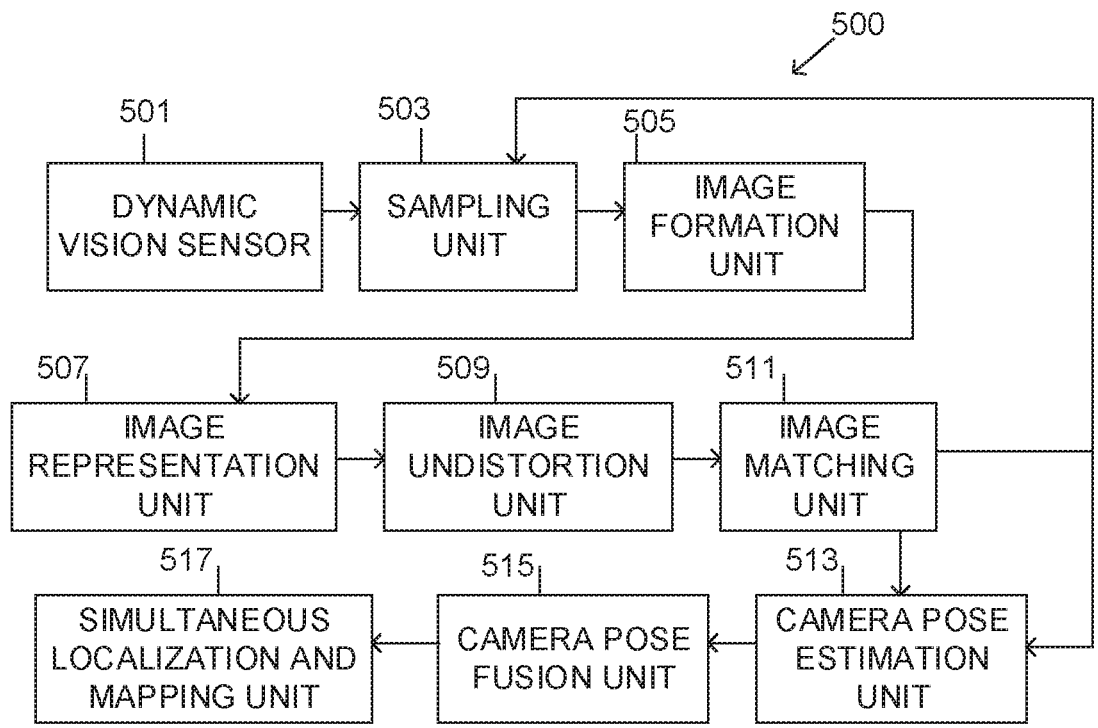
FIG. 5 is a block diagram of an apparatus of image representation and processing of DVS events, according to an embodiment of the present disclosure.

FIG. 5 is a block diagram of an apparatus 500 of image representation and processing of DVS events, according to an embodiment of the present disclosure. FIG. 5 concerns an SLAM application.

Referring to FIG. 5, the apparatus 500 includes a DVS 501, a sampling unit 503, an image formation unit 505, an image representation unit 507, an image undistortion unit 509, an image matching unit 511, a camera pose estimation unit 513, a camera pose fusion unit 515, and an SLAM unit 517.

In an embodiment of the present disclosure, an image denoising unit may be used between the image representation unit 507 and the image undistortion unit 509 to denoise images. However, image denoising is not required for image matching and SLAM.

The DVS 501 captures a change in pixel luminance (e.g., an event) within a scene and outputs a stream of events, where each event has a state. The state of an event includes a location of the event within a camera array and a binary value indicating either a positive or a negative change in the luminance of the associated event as compared to an immediately preceding state of the associated location.

The sampling unit 503 includes a first input connected to the output of the DVS 501 for receiving a stream of events from the DVS 501, a second input for adjusting a sampling manner of the sampling unit 503, and an output for outputting samples of the event stream. For the first two samples, the sampling manner may be the same, because at least two images may be needed before an adjustment to the manner of sampling may be made. Thereafter, the sampling manner may be different for the next sample.

The image formation unit 505 includes an input connected to the output of the sampling unit 503 for receiving samples of an event stream. The image formation unit 505 forms an image from each sample of an event stream and outputs an image for each sample of an event stream. The images formed for the first two samples are formed on the basis of the same manner of sampling, because at least two images may be needed before an adjustment to the manner of sampling may be made. Thereafter, each subsequent image may be formed on the basis of a different manner of sampling than the immediately preceding manner of sampling.

The image representation unit 507 includes an input connected to the output of the image formation unit 505, and an output. The image representation unit 507 may function similarly to the image representation unit 101 described above.

The image undistortion unit 509 includes an input connected to the output of the image representation unit 507, and an output. The image undistortion unit 509 removes or modifies a denoised image to compensate for distortion. The present disclosure may compensate for distortion by reducing distortion. However, the present disclosure is not limited thereto.

The image matching unit 511 includes an input connected to the output of the image undistortion unit 509, and an output connected to the second input of the sampling unit 503. The image comparison unit 511 compares two images output by the image undistortion unit 509 and determines whether events in the two images match (e.g., share the same location). Matched events are referred to as reference events. The image matching unit 511 outputs a signal to the sampling unit 503 to adjust the sampling manner, where the sampling manner may be reduced (e.g., reduce the sampling period, reduce the predetermined number of events in a sample, or reduce a combination of sampling period and number of events), the sampling manner may be increased (e.g., increase the sampling period, increase the predetermined number of events in a sample, or increase a combination of sampling period and number of events), or the sampling manner may be maintained.

In an embodiment of the present disclosure, the image matching unit 511 may match frames using weighted frame-to-frame matching. Weighted frame-to-frame matching may be performed as represented in Equation (2) above. However, the present disclosure is not limited to using weighted frame-to-frame matching as represented by Equation (2) above. Other equations for weighted frame-to-frame matching may be used in the present disclosure.

The camera pose estimation unit 513 includes an input connected to the output of the image matching unit 511, and an output. The camera pose estimation unit 513 estimates the pose of a camera for an image.

The camera pose fusion unit 515 includes an input connected to the output of the camera pose estimation unit 513, and an output. The camera pose fusion unit 515 fuses images based on estimated camera poses associated with the images.

The SLAM unit 517 includes an input connected to the output of the camera pose fusion unit 515, and an output. The SLAM unit 517 simultaneously determines a localization and a mapping in an image.

Figure 6:
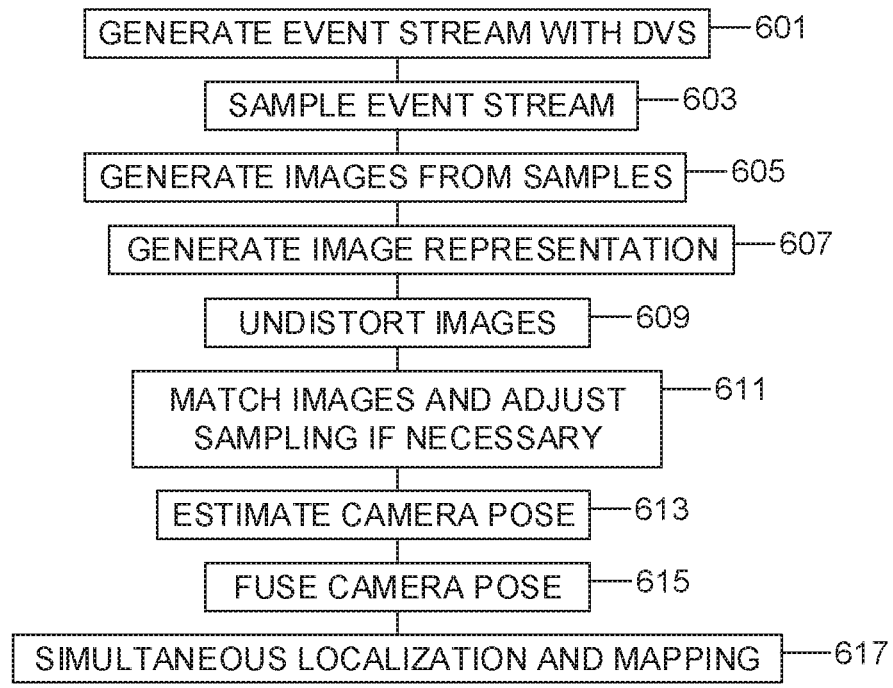
FIG. 6 is a flowchart of a method of image representation and processing of DVS events, according to an embodiment of the present disclosure.

FIG. 6 is a flowchart of a method of image representation and processing of DVS events, according to an embodiment of the present disclosure. FIG. 6 concerns an SLAM application.

Referring to FIG. 6, an event stream is generated by a DVS (e.g., the DVS 501 of FIG. 5) at 601.

At 603, the event stream is sampled in a manner by a sampling unit (e.g., the sampling unit 503 of FIG. 5).

At 605, images are generated for the samples by an image formation unit (e.g., the image formation unit 505 of FIG. 5).

At 607, confidence events are identified by an image representation unit (e.g., the image representation unit 101 of FIG. 1).

In an embodiment of the present disclosure, images may be denoised by an image denoising unit (e.g., the image denoising unit 103 of FIG. 1). However, the image denoising is not required for SLAM.

At 609, denoised images are undistorted by an undistortion unit (e.g., the undistortion unit 511 of FIG. 5).

At 611, the images are matched by an image matching unit (e.g., the image matching unit 513 of FIG. 5, and sampling is adjusted, if necessary.

In an embodiment of the present disclosure, image matching of frames may be performed using weighted frame-to-frame matching. Weighted frame-to-frame matching may be performed as represented in Equation (2) above. However, the present disclosure is not limited to using weighted frame-to-frame matching as represented by Equation (2) above. Other equations for weighted frame-to-frame matching may be used in the present disclosure.

At 613, camera poses of images are estimated by a camera pose estimation unit unit (e.g., the camera pose estimation unit 515 of FIG. 5).

At 615, images are fused based on estimated camera poses associated with the images by a camera pose fusion unit (e.g., the camera pose fusion unit 517 of FIG. 5).

At 617, localization and mapping of images is simultaneously determined by an SLAM unit (e.g., an SLAM unit 519 of FIG. 5).

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
an image representation unit configured to receive a sequence of frames generated from events sensed by a dynamic vision sensor (DVS), determine $N_1$, events within a neighborhood and a time W of each event, if $N_1$ is below a threshold $T_1$ discard an associated event as noise, determine a neighborhood density for each non-noise event, determine confidence events as events with neighborhood densities greater than threshold $T_2$, and generate a confidence map from the confidence events, where $N_1$, $N_2$, $T_1$, and $T_2$ are each integers; and
an image denoising unit connected to the image representation unit and configured to determine $N_2$ events within the neighborhood and the time W of each event, determine C confidence events in a previous frame in an equivalent neighbourhood, determine $(N_2+(\alpha \times C))$, determine noise events by comparing $(N_2+(\alpha \times C))$ to a threshold $T_3$, and denoise an image in a spatio-temporal domain by discarding the noise events, where $\alpha$, C, and $T_3$ are each integers.

2. The apparatus of claim 1, wherein each event is associated with four values representing an event state, wherein the four values include an x and a y coordinate of a pixel indicating a location of the event, either a value of +1 to indicate a positive change in luminance of the event, a value of −1 to indicate a negative change in luminance of the event, or a value of 0 to indicate no change in luminance of the event as compared to an immediately preceding event state of the associated location, and a timestamp of the event.

3. The apparatus of claim 1, wherein the image representation unit is further configured to determine, for each event not discarded, a neighborhood density I(valid_evt) as follows;

$$I(\text{valid}_{evt}) = \begin{cases} \dfrac{M}{\max(R_1, S)}, & \text{when } M \le R_2 \\ \dfrac{M}{k}, & \text{when } M > R_2 \end{cases},$$

where M is a number of events within a predetermined neighborhood of the event, including the event, S is a predetermined time window, $R_1$ is a threshold for avoiding values of S that are less than $R_1$, $R_2$ is a threshold when M is larger than a predetermined value, and k is a predetermined constant.

4. An apparatus, comprising:
a dynamic vision sensor (DVS) configured to generate a stream of events;
a sampling unit connected to the DVS and configured to sample the stream of events;
an image formation unit connected to the sampling unit and configured to form an image for each sample of the stream of events by determining $N_1$ events within a neighborhood and a time W of each event, if $N_1$ is below a threshold $T_1$, discarding an associated event as noise, determining a neighborhood density for each non-noise event, and determining confidence events as events with neighborhood densities greater than threshold $T_2$, where $N_1$, $N_2$, $T_1$, and $T_2$ are each integers;
an image representation unit connected to the image formation unit and configured to generate a confidence map from confidence events;
an image undistortion unit connected to the image representation unit and configured to compensate for distortion in frames by determining $N_2$ events within the neighborhood and the time W of each event, determining C confidence events in a previous frame in an equivalent neighbourhood, determine $(N_2+(\alpha \times C))$, determining noise events by comparing $(N_2+(\alpha \times C))$ to a threshold $T_3$, and denoising an image in a spatio-temporal domain by discarding the noise events, where $\alpha$, C, and $T_3$ are each integers; and
an image matching unit connected to the image undistortion unit and the sampling unit and configured to match frames and adjust a sampling method of the sampling unit, if necessary.

5. The apparatus of claim 4, wherein the image matching unit is further configured to match frames using weighted frame-to-frame matching as follows:

$$\arg\min \tfrac{1}{2}\Sigma_i C(p_i)\|I^{(1)}(p_i)-I^{(2)}(T \times p_i)\|^2,$$

where arg min $f(x)$ is an argument-of-a-minimum function that determines a value x for which a function $f(x)$ attains its minimum, where i is a location in a confidence map $C^{(1)}$ of a first image $I^{(1)}$, $p_i$ is a coordinate for location i, $I^{(2)}$ is a second image, and T is a transformation matrix that minimizes the arg min function.

6. A method, comprising:
receiving, by an image representation unit, a sequence of frames generated from events sensed by a dynamic vision sensor (DVS), determining $N_1$ events within a neighborhood and a time W of each event, if $N_1$ is below a threshold $T_1$, discarding an associated event as noise, determining a neighborhood density for each non-noise event, and determining confidence events as events with neighborhood densities greater than threshold $T_2$, and generating a confidence map from non-noise events, where $N_1$, $N_2$, $T_1$, and $T_2$ are each integers; and
denoising, by an image denoising unit connected to the image representation unit, images formed from the frames in a spatio-temporal domain by determining $N_2$ events within the neighborhood and the time W of each event, determining C confidence events in a previous frame in an equivalent neighbourhood, determine $(N_2+(\alpha \times C))$, determining noise events by comparing $(N_2+(\alpha \times C))$ to a threshold $T_3$, and denoising the image in a spatio-temporal domain by discarding the noise events, where $\alpha$, C, and $T_3$ are each integers.

7. The method of claim 6, wherein each event is associated with four values representing an event state, wherein the four values include an x and a y coordinate of a pixel indicating a location of the event, either a value of +1 to indicate a positive change in luminance of the event, a value of −1 to indicate a negative change in luminance of the event, or a value of 0 to indicate no change in luminance of the event as compared to an immediately preceding event state of the associated location, and a timestamp of the event.

8. The method of claim 6, further comprising determining, by the image representation unit, for each event not discarded, a neighborhood density I(valid_evt) as follows:

$$I(\text{valid}_{evt}) = \begin{cases} \dfrac{M}{\max(R_1, S)}, & \text{when } M \leq R_2 \\ \dfrac{M}{k}, & \text{when } M > R_2 \end{cases},$$

where M is a number of events within a predetermined neighborhood of the event, including the event, S is a predetermined time window, $R_1$ is a threshold for avoiding values of S that are less than $R_1$, $R_2$ is a threshold when M is larger than a predetermined value, and k is a predetermined constant.

9. A method, comprising
generating, by a dynamic vision sensor (DVS), a stream of events;
sampling, by a sampling unit connected to the DVS, the stream of events;
forming, by an image formation unit connected to the sampling unit, an image for each sample of the stream of events;
receiving, by an image representation unit connected to the image formation unit, images formed by the image formation unit and generating a confidence map from non-noise events by determining $N_1$ events within a neighborhood and a time W of each event, if $N_1$ is below a threshold $T_1$, discarding an associated event as noise, determining a neighborhood density for each non-noise event, and determining confidence events as events with neighborhood densities greater than threshold $T_2$, and generating the confidence map from non-noise events, where $N_1$, $N_2$, $T_1$, and $T_2$ are each integers;
compensating for distortion, by an image undistortion unit connected to the image representation unit, in frames by determining $N_2$ events within the neighborhood and the time W of each event, determining C confidence events in a previous frame in an equivalent neighbourhood, determine $(N_2+(\alpha \times C))$, determining noise events by comparing $(N_2+(\alpha \times C))$ to a threshold $T_3$, and denoising the image in a spatio-temporal domain by discarding the noise events, where $\alpha$, C, and $T_3$ are each integers; and
matching, by an image matching unit connected to the image undistortion unit and the sampling unit, frames and adjusting a sampling method of the sampling unit, if necessary.

10. The method of claim 9, wherein matching frames is comprised of weighted frame-to-frame matching as follows:

$$\arg\min \tfrac{1}{2}\Sigma_i C(p_i)\|I^{(1)}(p_i)-I^{(2)}(T \times p_i)\|^2,$$

where arg min $f(x)$ is an argument-of-a-minimum function that determines a value x for which a function $f(x)$ attains its minimum, where i is a location in a confidence map $C^{(1)}$ of a first image $I^{(1)}$, $p_i$ is a coordinate for location i, $I^{(2)}$ is a second image, and T is a transformation matrix that minimizes the arg min function.

* * * * *